United States Patent
Kirsch

[11] 3,782,104
[45] Jan. 1, 1974

[54] TIMER HAVING A COLOR-DISPLAY SYSTEM

[76] Inventor: Jordan Kirsch, 78 Huron Ave., Cambridge, Mass. 02138

[22] Filed: Aug. 10, 1972

[21] Appl. No.: 279,618

Related U.S. Application Data

[62] Division of Ser. No. 93,051, Nov. 27, 1970, Pat. No. 3,694,054.

[52] U.S. Cl. ............ 58/50 R, 40/130 A, 58/127 R, 350/157, 350/158, 350/159
[51] Int. Cl. .................. G04b 19/24, G02b 1/24
[58] Field of Search ............... 40/130 R; 58/50 R, 58/127 R; 350/157, 158

[56] References Cited
UNITED STATES PATENTS

| | | | |
|---|---|---|---|
| 2,146,962 | 2/1939 | Land | 40/130 A X |
| 2,506,134 | 5/1950 | Burchell | 58/50 R |
| 2,527,593 | 10/1950 | Stadler | 350/158 |
| 2,184,999 | 12/1939 | Land | 350/158 |
| 2,393,968 | 2/1946 | Burchell et al. | 350/158 |
| 2,473,857 | 6/1949 | Burchell | 350/158 |
| 3,431,044 | 3/1969 | Clark | 350/158 |
| 3,321,905 | 5/1967 | Krebs | 58/152 R |

*Primary Examiner*—Richard B. Wilkinson
*Assistant Examiner*—Edith Simmons Jackmon
*Attorney*—David Wolf

[57] ABSTRACT

A color-display system embodied in a clock mechanism wherein the face of the clock constantly changes color. A pair of transparent, light-polarizing sheets are arranged parallel to one another with one of the sheets forming the face of the clock. A pair of birefringent sheets are positioned between the polarizing sheets with one of the sheets having a greater retardance than the other. The one sheet is arranged with one of the principal axes at a fixed 45-degree angle relative to each of the polarizing axes. The other birefringent sheet is supported for rotation about an axis normal to the first birefringent sheet. Rotation of this birefringent sheet by the clock mechanism effectively changes the color of the clock face.

10 Claims, 3 Drawing Figures

PATENTED JAN 1 1974

3,782,104

TIMER HAVING A COLOR-DISPLAY SYSTEM

This is a division, of U.S. Pat. application Ser. No. 93,051 filed Nov. 27, 1970 now U.S. Pat. No. 3,694,054.

SUBJECT MATTER OF THE INVENTION

The present invention relates to a system for continuously changing observable color of a color display with the invention illustrated in an embodiment of a clock face.

BACKGROUND OF THE INVENTION

A number of systems exemplified by U.S. Pat. Nos. 2,018,214; 2,146,962 and 2,506,134 have been devised for constantly changing the color of a display or the like. Of the various systems that have been devised, optical systems using polarizing sheets have a number of significant advantages over other methods. However, even these polarizing techniques have certain limitations to which the present invention is directed.

Land U.S. Pat. No. 2,018,214 issued Oct. 22, 1935, discloses an arrangement of a pair of polarizing sheets with parallel polarizing axes having sandwiched between them a double-refracting sheet. The double-refracting or birefringent sheet is described in one embodiment as rotatable, thereby effecting a color change. Land U.S. Pat. No. 2,146,962 issued Feb. 14, 1939, further discloses a color-display configuration in which a similar pair of polarizing sheets are arranged with their axes of polarization at right angles or parallel to one another. A birefringent or doubly refracting element is sandwiched between these polarizing sheets and provides maximum color when the planes of polarization of the polarizing elements bisect the angle between the principal planes of the birefringent sheet. This patent also discloses the concept of adding a second doubly refracting element between the two polarizing sheets with one of the two doubly refracting elements movable.

These patents and similar work of others, however, do not provide maximum and constant saturation. Upon rotation of the doubly refracting or birefringent member in both of these arrangements, there is some significant amount of white light transmission and, further, the number of colors is limited. For example, in these systems there are provided color displays which generate two complementary colors, such as two blues and two yellows per cycle of rotation of the rotatable birefringent sheet. In the same cycle, however, four white colors are also generated. Effectively, therefore, these prior art schemes do not provide systems in which the brilliance and continuity of color are maximized.

SUMMARY OF THE INVENTION

It is an object of the present invention to overcome these and other limitations of the prior art. In the present invention, a means and method is provided in which maximum saturation (the ratio of colored light to white light) and constant saturation are attainable. Another object of this invention is to provide a means for constant color changes in a display or the like without the cycle including white light. It is also an object of the present invention to provide an optical system for generation of a broad range of colors not heretofore available in prior art systems. A further principal object of the present invention is to provide a means and method of improving saturation of colors in an optical-color display.

A further object of the invention is to provide an improved clock display or other display in which a plurality of different colors are constantly optically displayed using minimum mechanical activation and few moving components.

A further object of the present invention is to provide a simple, passive device useful in optical filters and the like, to provide continuously variable colors for such applications as photographic or television purposes.

The present invention provides a color-display system comprising a pair of light-transmitting, polarizing sheets arranged parallel to one another and each having a polarizing axis. A pair of birefringent sheet means are interposed between the polarizing sheets with each of these birefringent sheet means having a set of principal axis, fast and slow. One of the birefringent sheet means has a greater retardance than the other. This sheet means has one of its principal axis fixed at an angle of 45° with respect to the polarizing axis of the polarizing sheets. Means are provided for rotating the other birefringent sheet means about an axis normal to the first-mentioned birefringent sheet means. In the embodiment of a clock, the clock mechanism rotates this birefringent sheet means.

BRIEF DESCRIPTION OF THE DRAWINGS

The foregoing object and advantages of the present invention will be more clearly understood when considered in conjunction with the accompanying drawings in which.

DESCRIPTION OF THE PREFERRED EMBODIMENT

Figure 1:
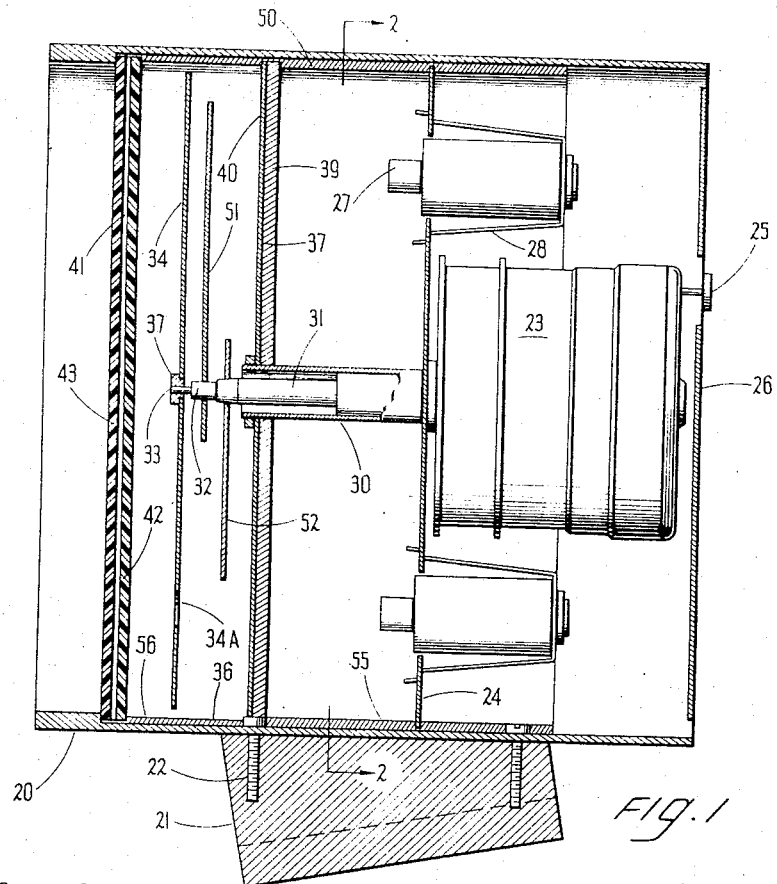
FIG. 1 is a center, cross-sectional view of a clock illustrating a preferred form of the invention.

The present invention is described in a preferred embodiment of a clock. It should be understood, however, that other embodiments utilizing the principles claimed are contemplated and would include, for example, signs, filters and displays.

In the present invention there is provided a pair of light-polarizing sheets, 10 and 11, of the type commonly sold by Polaroid Corporation. These light-transmitting sheets 10 and 11 have polarizing axes which in one embodiment may be fixed relative to each other at an angle of 90°. A birefringent or doubly refracting transparent sheet 12 is interposed between sheets 10 and 11. The birefringent or doubly refracting sheet 12 has orthogonally related, principal, fast-and-slow axes. These axes are arranged at an angle of 45° with respect to each of the polarizing axes of sheets 10 and 11. Sheets 10, 11 and 12 are fixed relative to each other. Sheet 12 has a large retardance preferably in the order of magnitude of 560 millimicrons which is the wavelength of green light and which is in the center of the visible light spectrum. A fourth sheet 14 is positioned with its surface in a plane parallel to the surfaces of the other sheets 10, 11 and 12, and between sheets 10 and 12. Alternatively, sheet 14 may be positioned as illustrated by the dotted line 14A between sheets 12 and 11. Sheet 14 is a doubly refractive or birefringent sheet having a small amount of retardance relative to sheet 12, preferably in the order of 140 millimicrons, when sheet 12 has a retardance of 560 millimicrons. This sheet 14 is supported for rotation about the horizontal axis 15 and is rotatable for 360°. The sheets 10, 11, 12 and 14 may be spaced apart or sandwiched together depending upon the specific application involved. The effective retardance of the two sheets 12 and 14 with respect to light passing through the system is the equivalent of a single sheet which varies in the amount of retardance at an angle of 45°. In effect, this system provides a mathematical vector of constant angle which varies in length. This differs from earlier efforts referred to above in which the mathematical equivalent of the light transmission was that of a vector of constant length that varied in angle. The vector being a measure of phase delay, the length of the vector corresponding to the retardance, and the angle of the vector corresponding to the angle of the retarder.

It has been found that optimum color display is attained when the retardance of the fixed sheet 12 is equal to 560 millimicrons, and that of the rotatable sheet 14 is 140 millimicrons. In a modification of this invention, in place of sheet 12 having a retardance of 560 millimicrons, two sheets of birefringent material each having a retardance of 280 millimicrons may be substituted. One of these 280 millimicron sheets would be laminated to surface 18 of sheet 11, and the other would be laminated to surface 19 of sheet 10.

Figure 3:
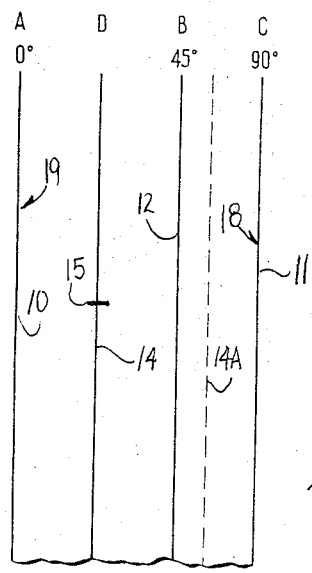
FIG. 3 is a schematic illustration useful in understanding the principles of the invention.

In a further modification of this invention, sheets 10 and 11 may be arranged with their polarizing axes at zero degrees with respect to each other. In this configuration fixed sheet 12 would have a retardance of 840 millimicrons. In such an arrangement, sheet 12 may either be a single sheet as illustrated in FIG. 3; or a pair of laminated sheets each of 420 millimicrons' retardance, laminated one to each of the inner surfaces of the polarizing sheets 10 and 11.

Common to both embodiments is the arrangement of the two polarizing sheets 10 and 11 which are fixed relative to each other with their polarizing angles optimized at either 90° or 0° relative to each other. A third birefringent sheet is arranged is fixed relation to these polarizing sheets with its principal axis at an angle of 45 degrees. A fourth birefringent sheet with less retardance than the fixed birefringent sheet is interposed between the two polarizing sheets and is rotatable with respect thereto.

Figure 2:
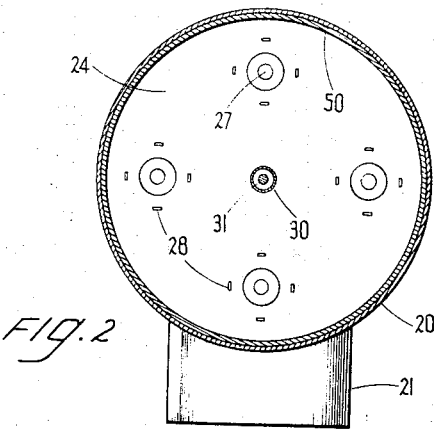
FIG. 2 is a cross-sectional view taken substantially along the line 2—2 of FIG. 1.

In the embodiment of a clock as illustrated in FIGS. 1 and 2, there is provided clock housing 20 which may be cylindrical in configuration. A suitable base 21 is secured to the housing by conventional means, such as screws 22. A clock motor 23 is supported on a mounting web or disc 24 with the clock control 25 projecting through the rear cover 26 of the clock. Four lamp assemblies 27, preferably incandescent lights, are supported by brackets 28 to the web 24 and are arranged radially about the motor 23, preferably at radial angles of 90° with respect to each other. The clock motor 23 has a shaft assembly 30 that projects through the web 24. This shaft assembly 30 includes hour-hand shaft 31 and a coaxial, minute-hand shaft 32. Also included is a third coaxial shaft 33 which ordinarily would comprise a second-hand shaft. This third shaft 33 has secured to it a rotatable birefringent sheet 34 which is equivalent to the sheet 14 of FIG. 3, except that it is provided with a small, circular hole 34A. Sheet 34 is a circular sheet having a periphery 35 that is spaced parallel and close to the inner surface 36 of the cylindrical clock housing 20. A rigid transparent sheet or plate of glass may be laminated to the sheet 34 for support purposes. Sheet 34 is suitably secured to the shaft 33 by a suitable cap or fastener 37.

A polarizing sheet 37 corresponding to sheet 10 is supported within the cylindrical housing 20. This sheet 37 extends across the entire inner surface of the cylindrical case 20 and is secured at its periphery to the inner wall or surface of the housing. This sheet 37 may be supported on a suitable transparent or translucent glass backer or plate 39 which also extends across the inside of the case 20. The plate 39 may be designed to diffuse light from the lamps 27 to provide a uniform light distribution. A birefringent sheet 40 corresponding to sheet 12 and having a principal axis at an angle of 45° with respect to polarizing axis of the sheet 37 is suitably laminated to the polarizing sheet 37. This sheet 40 which is circular in configuration also extends across the inside of the cylindrical case 20. A second polarizing sheet 41 corresponding to sheet 11 is secured within the cylindrical housing 20 on the side of sheet 34 opposite to the side on which sheet 37 is secured. Polarizing sheet 41 is preferably sandwiched between two glass sheets 42 and 43, the outer one of which is preferably non-glare glass. The various sheets are spaced by a rear spacer ring, 55, secured by screws 22; a middle spacer ring 50 which buts on one edge against web 24 and ring 55; a front spacer 56 which buts at one edge against sheets 40 and 39 and the other edge of ring 50; and a shoulder at the forward end of housing 20.

In the preferred embodiment of the clock shown in FIG. 1, polarizing sheets 41 and 37 are arranged with a polarizing axis at 90° with respect to each other. The birefringent sheet 40 has a retardance of 560 millimicrons. This birefringent sheet 40 has its principal axes at 45° angles with respect to the polarizing axes of the polarizing sheets. The birefringent sheet 34 has a retardance of 140 millimicrons, and is rotatable on the second-hand shaft 33. The birefringent sheet 40 can be replaced with two birefringent sheets having retardances of 280 millimicrons, with one each laminated to the inner surfaces of the polarizing sheets 37 and 41 for ease in manufacturing and assembly. The hole 34A near the edge 35 functions as a second hand and simulates a dot which remains a constant purple, and which appears to float around the clock face once a minute.

The minute and hour hands 51 and 52 of the clock are preferably formed of a birefringent material having a retardance of 140 millmicrons. Hands made of such material will change colors as the hands rotate with the color changes differing from each other and differing from the background, as viewed from the face of the clock.

Although the preferred embodiment describes an arrangement for maximizing color saturation by using birefringent material of specific retardance, it should be understood that these parameters have been found to be optimum, and that variances from these optimum parameters may be adopted with a lessening of efficiency of saturation and content saturation. In a contemplated embodiment, the polarizing sheets and birefringent sheets may be secured in a frame with the polarizing sheets and one birefringent sheet fixed relative to one another, as described. The movable birefringent sheet may be secured with a lever or the like for manual rotation movement. Suitable clamps or securing means may be provided to use the unit as a light filter over a projector for such uses as stagelights, etc. While the two foregoing examples illustrate the preferred embodiments of the invention, the invention may be varied in several parameters. Specifically, when polarizing sheets are used with their polarizing axes fixed relative to one another at angles of 90°, satisfactory color display may be effected with a fixed birefringent sheet having a retardance which corresponds to even multiples of a half-cycle of phase delay for light at the center of the visible band and below six. Thus, for example, a birefringent, fixed sheet of 560 millimicrons, 1,120 millimicrons, 1,680 millimicrons, and 2,240 millimicrons may be used. Where the polarizing sheets have parallel, polarizing axes, the fixed birefringent sheet should have a retardance which corresponds to an odd multiple above one but preferably below seven, of a half-cycle of phase delay for light at the center of the visible band. Thus, for example, a birefringent fixed sheet of 840 millimicrons, 1,400 millimicrons, 1,960 millimicrons, 2,520 millimicrons and 3,080 millimicrons would be used. In both of these modifications, the movable, birefringent sheet should preferably have a retardance equal to a quarter-cycle of phase delay for light at the center of the visible band. Increases in this retardance will limit the range of colors capable of being displayed.

I claim:

1. A color-display clock comprising a pair of bight-transmitting, polarizing sheets arranged parallel to one another, and each having a polarizing axis, a pair of birefringent sheet means, each interposed between said polarizing sheets and each having a set of principal axis, one of said birefringent sheet means having greater retardance than the other, said one sheet means being fixed relative to said polarizing sheets with one of its principal axes at an angle of 45° to the polarizing axis of each of said polarizing sheets, hands, one of said polarizing sheets comprising a face of said clock, means for rotating said other birefringent sheet means about an axis normal to said one birefringent sheet means, and means securing at least one of said hands to said means for rotating.

2. A clock as set forth in claim 1 wherein the hour, minute and second hands are each formed of a birefringent material.

3. A clock as set forth in claim 1 including means forming a hole in said other birefringent sheet.

4. A clock as set forth in claim 1 including illumination means disposed adjacent said one polarizing sheet and remote from the other polarizing sheet.

5. A clock as set forth in claim 4 wherein said illumination means comprises a plurality of lamps spacedly disposed about a center axis of the clock.

6. A clock as set forth in claim 5 comprising common support means, wherein said means for rotating includes a motor and said lamps and motor are carried by said common support means with said lamps disposed radially of said motor.

7. A clock as set forth in claim 1 wherein said hands include a minute hand and an hour hand, said other birefringent sheet being circular and forming a second hand, all said hands being secured to said means for rotating.

8. A clock as set forth in claim 7 comprising a pair of glass sheets sandwiching said other polarizing sheet.

9. A clock as set forth in claim 3 wherein said hole is formed near the outer edge of said other birefringent sheet.

10. A clock as set forth in claim 1 including at least one of said hands formed of a birefringent material.

* * * * *